(12) United States Patent
Brockway

(10) Patent No.: US 6,641,176 B2
(45) Date of Patent: Nov. 4, 2003

(54) WIDE CLAMPING BAND FOR CLAMPING A CONNECTOR BOOT WITHIN A HOLE THROUGH A GENERALLY CYLINDRICAL WALL

(75) Inventor: Robert D. Brockway, Bedford, NH (US)

(73) Assignee: NCP, Inc., Milford, NH (US)

( * ) Notice: Subject to any disclaimer, the term of this patent is extended or adjusted under 35 U.S.C. 154(b) by 0 days.

(21) Appl. No.: 09/825,419

(22) Filed: Apr. 3, 2001

(65) Prior Publication Data

US 2002/0140224 A1 Oct. 3, 2002

(51) Int. Cl.[7] .................................................. F16L 41/08
(52) U.S. Cl. ........................ 285/230; 285/235; 285/236
(58) Field of Search ................................. 285/230, 235, 285/236

(56) References Cited

U.S. PATENT DOCUMENTS

| | | |
|---|---|---|
| 2,803,866 A | 8/1957 | Flora |
| 2,922,212 A | 1/1960 | Textrom |
| 3,120,965 A | 2/1964 | MacDonald |
| 3,188,121 A | 6/1965 | Cude et al. |
| 3,355,193 A | 11/1967 | Craig et al. |
| 3,432,188 A | 3/1969 | Turner |
| 3,486,774 A | 12/1969 | Corey |
| 3,490,794 A | 1/1970 | Swanson |
| 3,516,446 A | 6/1970 | O'Hargan et al. |
| 3,540,759 A | 11/1970 | Schneider |
| 3,622,184 A | 11/1971 | Deasy et al. |
| 3,649,055 A | 3/1972 | Nilsen |
| 3,779,272 A | 12/1973 | Dunmire |
| 3,813,116 A | 5/1974 | Horsley |
| 3,825,286 A | 7/1974 | Henry, III |
| 3,840,053 A | 10/1974 | Sluga |
| 3,933,377 A | 1/1976 | Arrowood |
| 3,958,313 A | 5/1976 | Rossborough |
| 3,960,395 A | 6/1976 | Cirule et al. |
| 3,967,839 A | 7/1976 | Dunmire |
| 4,059,293 A | 11/1977 | Sipler |
| 4,078,833 A | 3/1978 | Carter |
| 4,107,454 A | 8/1978 | Jakobsen |
| 4,215,868 A | 8/1980 | Skinner et al. |
| 4,242,164 A | 12/1980 | Skinner |
| 4,305,679 A | 12/1981 | Modi |
| 4,346,922 A | 8/1982 | Ohtsuga et al. |
| 4,387,900 A | 6/1983 | Ditcher et al. |
| 4,441,744 A | * 4/1984 | Oostenbrink et al. ....... 285/162 |
| 4,449,715 A | 5/1984 | Gagas |
| 4,469,467 A | 9/1984 | Odill et al. |
| 4,475,845 A | 10/1984 | Odill et al. |
| 4,478,437 A | 10/1984 | Skinner |
| 4,494,780 A | 1/1985 | Burnett |
| 4,543,691 A | 10/1985 | Calmettes |
| 4,606,558 A | 8/1986 | Davidson |
| 4,613,171 A | 9/1986 | Corcoran |
| 4,702,645 A | 10/1987 | Skinner et al. |

(List continued on next page.)

FOREIGN PATENT DOCUMENTS

GB           2214255        *   8/1989

Primary Examiner—Lynne H. Browne
Assistant Examiner—G M Collins
(74) Attorney, Agent, or Firm—Bourque & Associates, P.A.

(57) ABSTRACT

The clamping band is used to clamp a connector boot within a hole in a manhole riser or other generally cylindrical structure, particularly where the depth of the hole is greater than the thickness of the manhole riser. The clamping band has a width such that a portion of the band extends beyond the hole surface. The clamping band preferably overhangs both the inner surface and outer surface of the generally cylindrical wall of the manhole riser. In one embodiment, the clamping band is used to affect a pipe-to-manhole connection.

21 Claims, 6 Drawing Sheets

U.S. PATENT DOCUMENTS

| | | |
|---|---|---|
| 4,705,305 A | 11/1987 | Ghaly |
| 4,711,455 A | 12/1987 | Ditcher et al. |
| 4,715,626 A | 12/1987 | Gehring et al. |
| 4,746,127 A | 5/1988 | Westhoff et al. |
| 4,890,863 A | 1/1990 | Westhoff et al. |
| 4,900,069 A | 2/1990 | Lucas |
| 4,903,970 A | 2/1990 | Ditcher et al. |
| 4,911,380 A | 3/1990 | Regipa |
| 4,927,189 A | 5/1990 | Burkit |
| 4,954,004 A | 9/1990 | Faber et al. |
| 4,966,397 A | 10/1990 | McKinnon |
| 5,020,832 A | 6/1991 | Coblentz |
| 5,024,404 A | 6/1991 | Ballard |
| 5,029,907 A | 7/1991 | Gundy |
| 5,054,794 A | 10/1991 | Westhoff et al. |
| 5,150,927 A | 9/1992 | Skinner |
| 5,180,196 A | 1/1993 | Skinner |
| 5,209,601 A | 5/1993 | Odill et al. |
| 5,360,241 A | 11/1994 | Gundy |
| 5,431,459 A | 7/1995 | Gundy |
| 5,496,128 A | 3/1996 | Odill |
| 5,501,472 A * | 3/1996 | Brancher et al. ........... 277/178 |
| 5,738,359 A | 4/1998 | Gundy |

* cited by examiner

WIDE CLAMPING BAND FOR CLAMPING A CONNECTOR BOOT WITHIN A HOLE THROUGH A GENERALLY CYLINDRICAL WALL

FIELD OF THE INVENTION

The present invention relates to clamping bands and more particularly, to a wide clamping band for clamping a connector boot within a hole through a generally cylindrical wall, such as in a pipe-to-manhole connection.

BACKGROUND OF THE INVENTION

Underground sewer systems typically include a pipe-to-manhole connection 10, FIG. 1. A manhole riser 12, FIG. 2, has a generally cylindrical side wall 14 with at least one opening or hole 16 formed in the side wall 14 either by casting or coring. A pipe 18 extends through the hole 16. The pipe 18 is connected to the manhole riser 12 using a connector boot 20, which is secured to the pipe 18 using an external clamping band 22.

As shown in greater detail in FIG. 3, the connector boot 20 is secured within the hole 16 using an internal clamping band 24. The clamping bands 22, 24 can include conventional expanding/locking mechanisms 26, for example, as disclosed in greater detail in U.S. Pat. Nos. 3,958,313, 5,431,459, 5,738,359, and 5,029,907, all of which are incorporated herein by reference. The pipe 18 and manhole riser 12 are thereby joined together and sealed using the connector boot 20 and clamping bands 22, 24.

In these conventional pipe-to-manhole connections, there has been a limitation on the maximum size of the hole diameter $D_h$. Prior to the present invention, it was thought that the clamping band 24 must have nearly 100% contact with the inner surface 28 of the hole 16. In other words, the band 24 could not have any overhang inside or outside the hole 16. Thus, it was previously thought that a more narrow band 24 was better in this type of connection.

As shown in greater detail in FIG. 4, the region 29 within which the band 24 can be positioned (with nearly 100% contact) is limited because of the curvature of the generally cylindrical wall 14. For example, a manhole riser having an inner diameter $D_I$ of 48", and an outer diameter $D_o$ of 58" could have a maximum hole diameter $D_h$ of 28" allowing a clamping band having a width of about 1.938". To increase the hole diameter $D_h$ further would decrease the size of the band clamping region 29 to a point where the width of the band is too small to adequately secure the connector boot. Thus, in conventional pipe-to-manhole connections, for each manhole diameter/wall thickness, there is a recommended maximum hole diameter and maximum band size.

Some special connections were developed in an effort to allow a larger hole size. These special connections, however, required special tooling and were often difficult to replace.

Special seals have also been developed to allow for larger hole sizes, for example, compression seals and contour seals such as the types available from A-LOK Products, Inc. and NPC, Inc. These seals also have drawbacks. Compression seals depend on accurate manufacturing tolerances on the pipe utilized in the seal. Changes in pipe OD generally have a large impact on the ease of installation and sealing performance. Compression seals also require specialized manufacturing forms or mandrels. Compression seals further require exact pipe alignment and very high assembly forces (requiring heavy equipment such as back hoes). Contour seals are inflated with water, and specialized pumps are required for installation. Both compression and contour seals will not work with corrugated or ribbed pipes. The curved contours of these seals tend to cross over adjacent ribs creating a leak path.

Accordingly, there is a need for a clamping band capable of being used in a hole within a manhole riser or other generally cylindrical wall at hole diameters in excess of the conventional maximum hole diameter.

SUMMARY OF THE INVENTION

The present invention features a connection system comprising a structure having a hole through a generally cylindrical wall of the structure. The hole extends from an outer generally cylindrical surface to an inner generally cylindrical surface of the structure. The connection system also comprises a connector boot having a first end portion and a second end portion with the first end portion extending into the hole in the structure. A clamping band is positioned against an inner boot surface of the first end of the connector boot and applies pressure outwardly to clamp the connector boot against an inner hole surface of the hole. The clamping band has a width such that at least one portion of the clamping band extends beyond the inner hole surface to provide an overhang. Providing a wider clamping band that overhangs is a counter intuitive solution to the problem of securing connector boots in holes having larger diameters According to a preferred embodiment, at least one portion of the band overhangs the outer generally cylindrical surface of the wall and at least one portion of the band overhangs the inner generally cylindrical surface of the wall. Preferably, about 43% of the clamping band makes contact with the inner hole surface.

The present invention also features a method of connecting a pipe to a structure having a generally cylindrical wall with a hole therethrough, such as a pipe-to-manhole connection. The method comprises the acts of positioning a first end portion of a boot within the hole in the generally cylindrical wall such that at least one portion of the connector boot extends beyond a generally cylindrical inner surface of the wall. The clamping band is then positioned within the first end portion of the connector boot. The clamping band is then expanded and locked against the first end portion of the connector boot to secure the first end portion of the connector boot against an inner hole surface of the hole. At least one portion of the clamping band overhangs the generally cylindrical inner surface and at least one portion of the clamping band overhangs a generally cylindrical outer surface of the wall. The second end portion of the connector boot is then secured to the pipe.

The present invention also features a clamping band comprising a band having a width such that a portion of the band extends beyond an inner hole surface to overhang the inner generally cylindrical surface and a portion of the band extends beyond the inner hole surface to overhang the outer generally cylindrical surface. The clamping band also comprises a band locking mechanism coupled to a band proximate the first and second band ends to lock the band into position.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
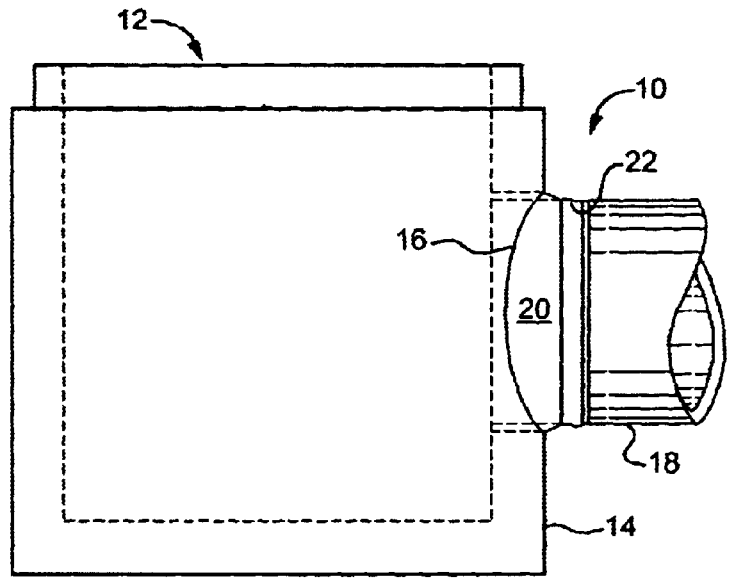
FIG. 1 is a side elevational view of a pipe-to-manhole connection, according to the prior art.
Figure 3:
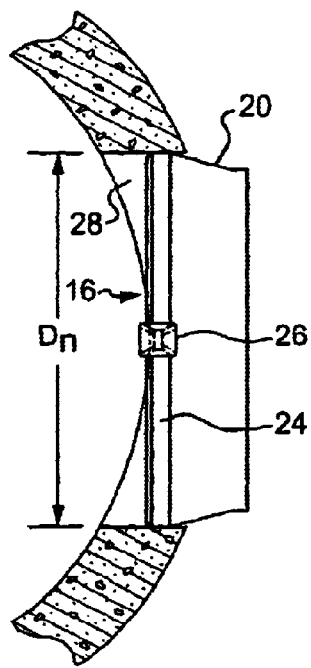
FIG. 3 is a cross-sectional view of the connector boot and internal clamping band used in the hole in the manhole riser, according to the prior art.
Figure 2:
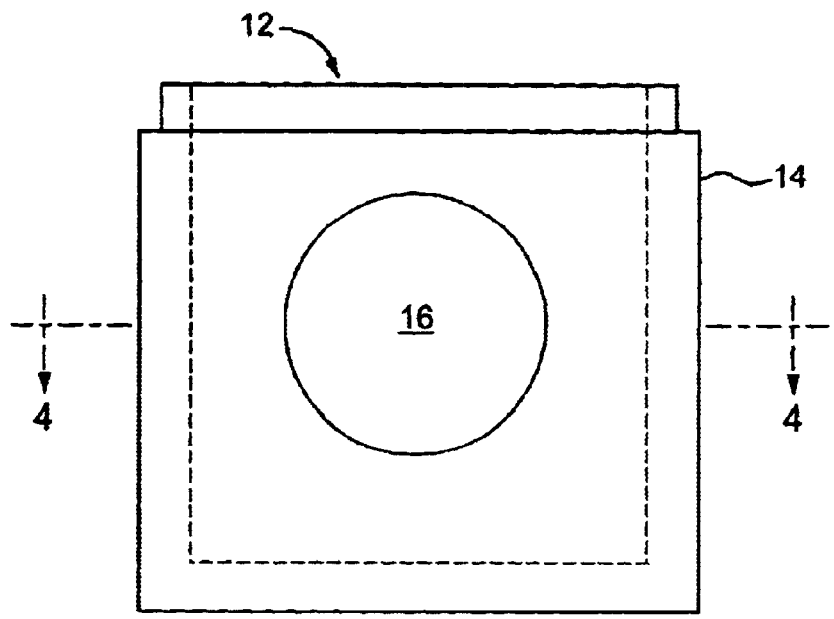
FIG. 2 is a side elevational view of a manhole riser having a hole through the side wall, according to the prior art.
Figure 4:
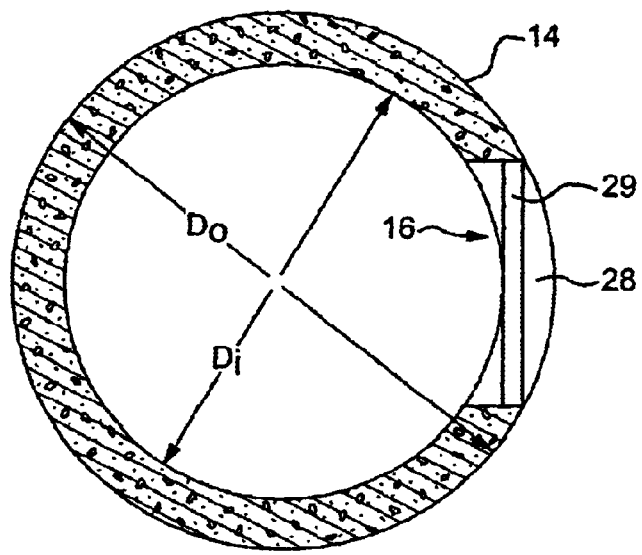
FIG. 4 is a cross-sectional view of the manhole riser taken along line 4—4 in FIG. 2.
Figure 5:
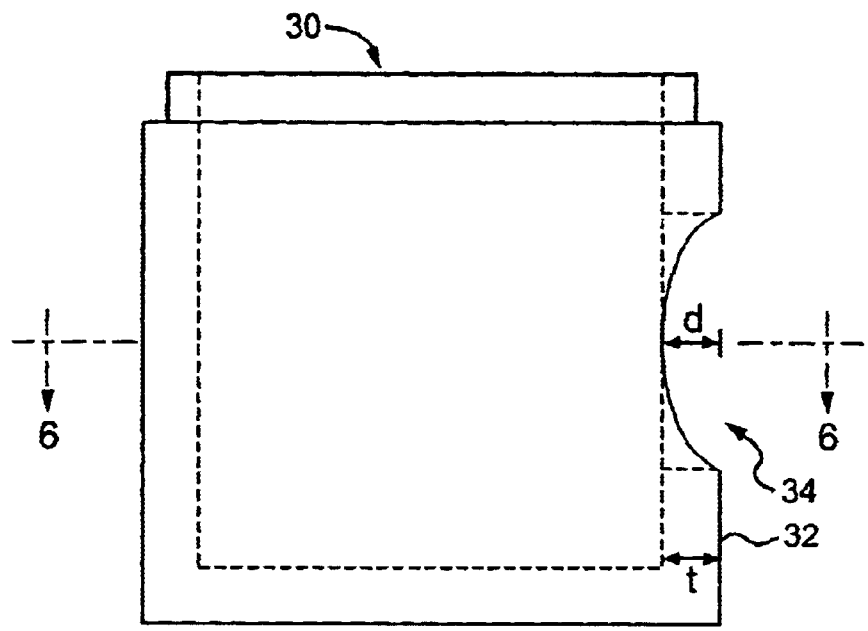
FIG. 5 is a side elevational view of a manhole riser having a hole that is deeper than the wall thickness.
Figure 6:
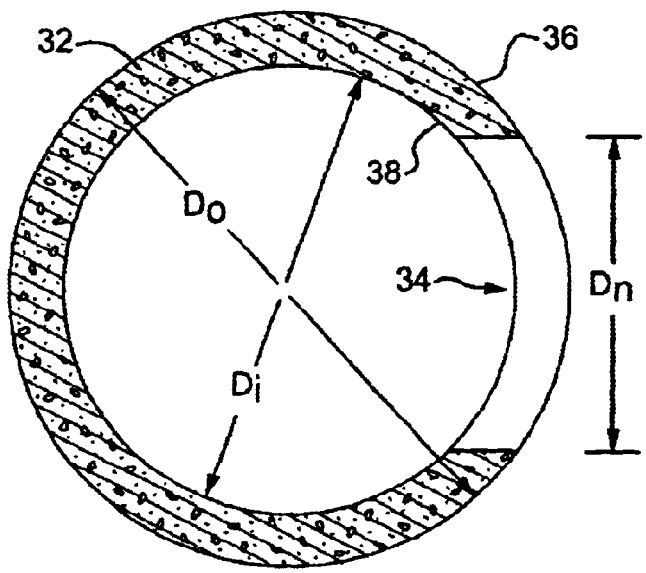
FIG. 6 is a cross-sectional view of the manhole riser taken along line 6—6 in FIG. 5.

The connection system of the present invention is used with a structure 30, FIGS. 5 and 6, having a generally cylindrical wall 32 and a hole 34 extending through the wall 32. The hole 34 extends from a generally cylindrical outer surface 36 to a generally cylindrical inner surface 38. The depth d of the hole 34 can be, but is not necessarily, deeper than the thickness t of the wall 32. In the exemplary embodiment, the structure 30 is a manhole riser and the hole 34 is used to connect to a pipe. The connection system of the present invention, however, can be used in any type of structure having a generally cylindrical wall with a hole extending therethrough.

Figure 7:
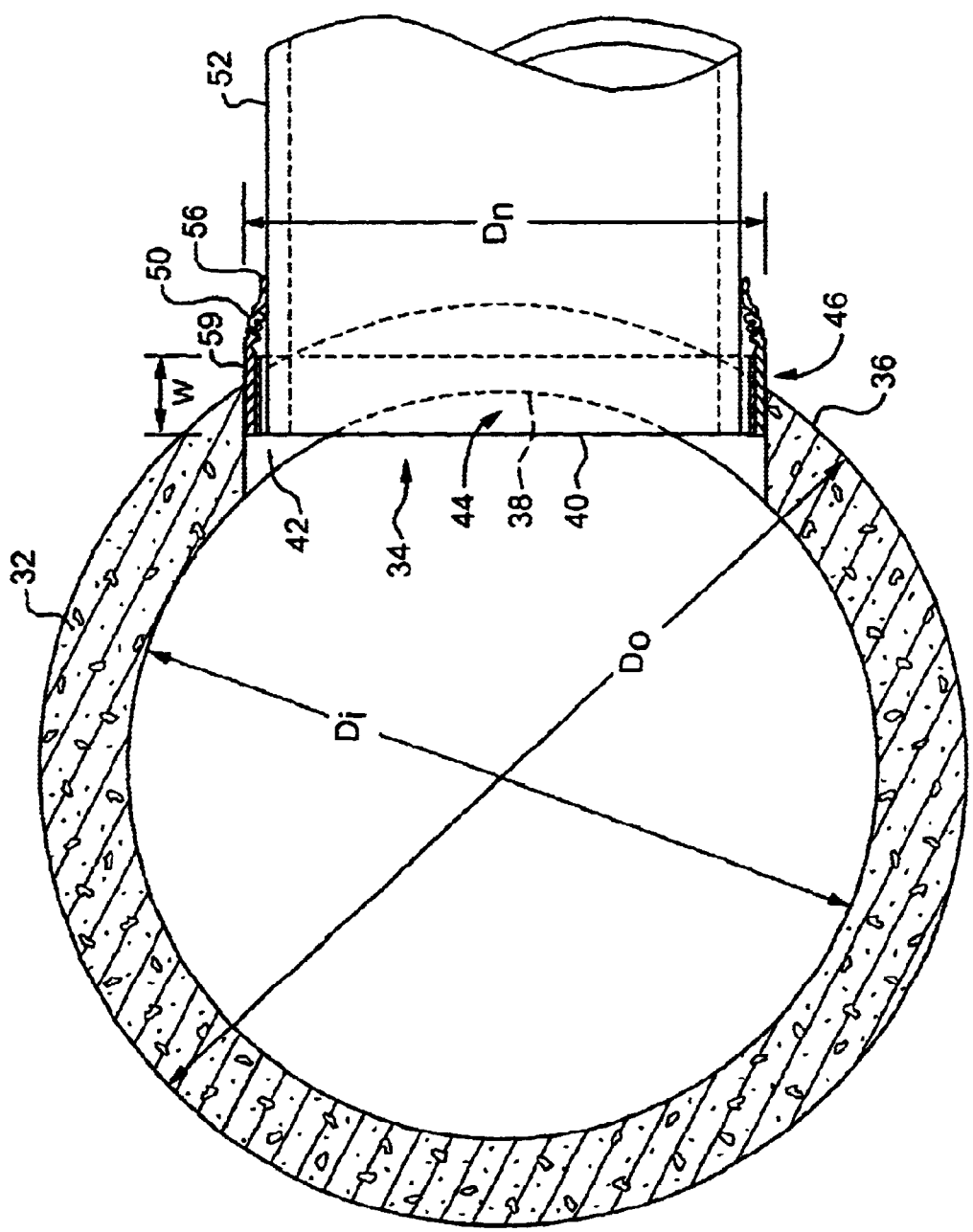
FIG. 7 is a cross-sectional view of a connection system including a wider clamping band, according to the present invention.

The clamping band 40, FIG. 7, according to the present invention, has a width W such that at least a portion of the clamping band 40 extends beyond the inner hole surface 42. In a preferred embodiment, a portion 44 of the clamping band 40 overhangs the inner surface 38 and a portion 46 of the clamping band 40 overhangs the outer surface 36. In one preferred embodiment, approximately 43% of the clamping band 40 makes contact with the inner hole surface 42 (indirectly through the connector boot 50). The clamping band 40 is preferably positioned to have substantially equal spacing or overhang with respect to the inner surface 38 and the outer surface 36.

According to one example, the structure 32 has an inner diameter $D_i$ of about 48", an outer diameter $D_o$ of about 58", and a hole diameter $D_h$ of about 34". In this example, the clamping band 40 has a width W of about 4" and about 1.72 inches of contact across the width of the band 40 (i.e., 43% contact). Although other amounts of contact are contemplated, the band preferably has greater than about 1 in. of contact.

Figure 8:
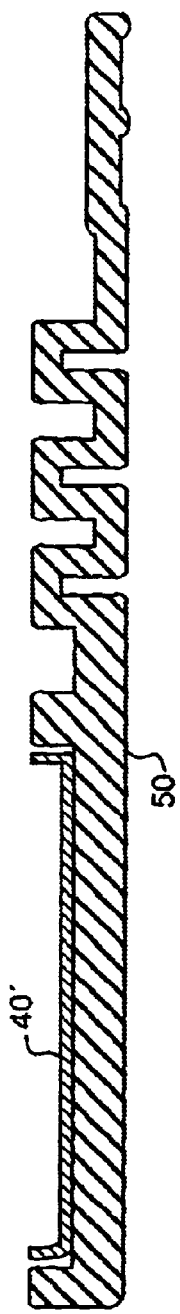
FIG. 8 is a cross-sectional view of the clamping band and connector boot, according to one embodiment of the present invention.

One preferred embodiment of the clamping band 40', FIG. 8, has a thickness of about 0.075 in. and is formed as a "C" channel to provide the necessary rigidity. The clamping band 40 can also have a flat cross section as shown in FIG. 7. The exemplary clamping band 40 is preferably made of 304 or 316 stainless steel.

Figure 10:
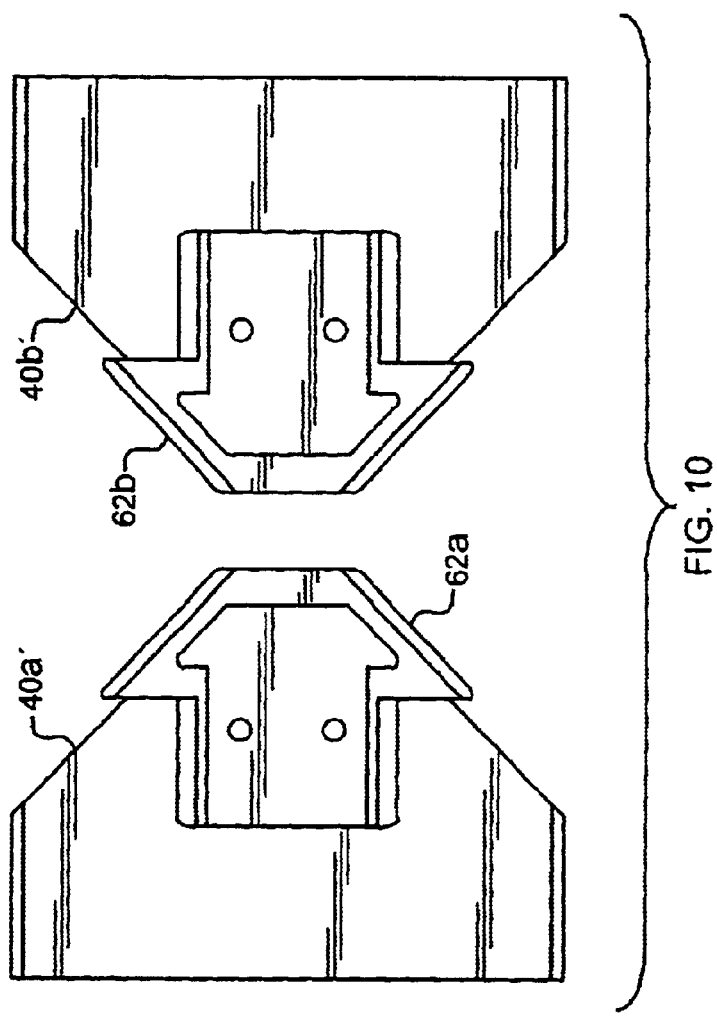
FIG. 10 is a plan view of the cam members used in the wedge assembly shown in FIG. 9.
Figure 9:
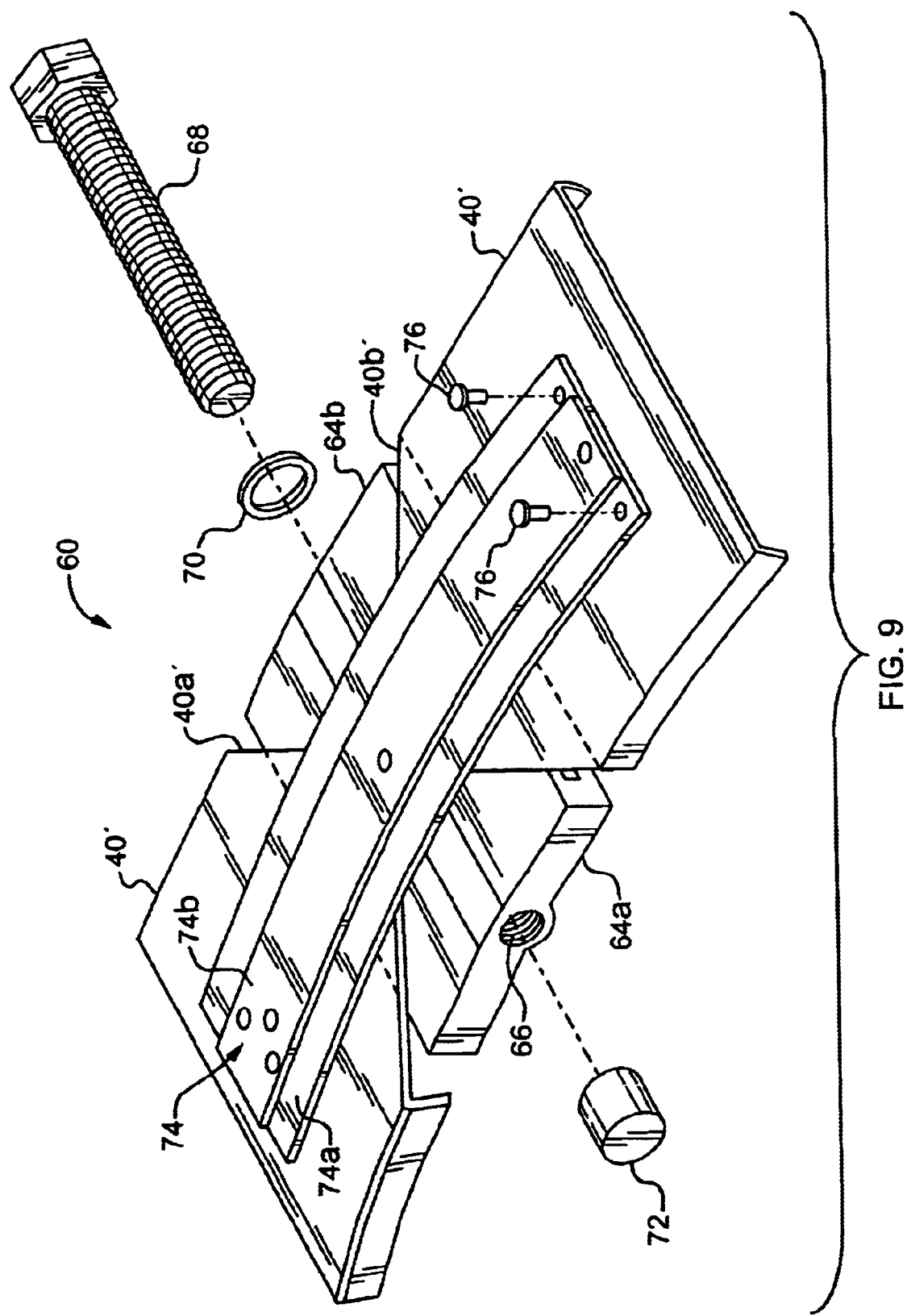
FIG. 9 is a partially exploded view of a wedge assembly used to expand the clamping band, according to one embodiment of the present invention.

The clamping band 40, 40' preferably includes an expanding/locking mechanism such as a wedge assembly 60, FIGS. 9 and 10. The wedge assembly 60 includes first and second cam members 62a, 62b attached to first and second ends 40a', 40b' of the clamping band 40', for example, by spot welding (FIG. 10). Although the exemplary embodiment shows cam members 62a, 62b having an arrowhead shape, other shapes are contemplated. First and second wedges 64a, 64b are engaged with the cam members 62a, 62b to cause the cam members 62a, 62b to move and the ends 40a', 40b' of the clamping band 40' to expand (FIG. 9).

In the exemplary embodiment, the first wedge 64a includes a threaded hole 66 and the second wedge 64b includes an unthreaded hole (not shown). A threaded bolt 68 passes through the unthreaded hole in the second wedge 64b and threadably engages the threaded hole 66 in the first wedge 64a. Tightening the bolt 68 causes the wedges 64a, 64b to move together, thereby causing the ends 40a', 40b' of the clamping band 40' to expand. A washer 70 can be used to facilitate tightening of the bolt 68. A protective cap 72 can be used to protect the end of the bolt 68 extending out of the threaded hole 66.

One or more flaps 74 can be used to provide a relatively smooth transition in the area of the wedge assembly 60. Although the exemplary embodiment shows two flaps 74a, 74b spot welded together, a single flap can also be used. The flap(s) 74 are welded to one end 40a' of the clamping band 40' and are temporarily held in place at the other end 40b' of the clamping band 40', for example, by rivets 76. When the band 40' is expanded by the wedge assembly 60, the rivets 76 are sheared off to allow the band 40' to expand.

The connector boot 50 (FIG. 7) is preferably made of an elastomeric material. The connector boot 50 is similar to conventional connector boots having a first end portion 54 positioned within the hole 34 and a second end portion 56 secured against a pipe 52. The first end portion 54 is dimensioned to correspond to the width of the clamping band 40.

According to one method of connecting the pipe 52 to the structure 32, the first end portion 54 of the connector boot 50 is positioned within the hole 34. Such that a portion of the connector boot 54 extends beyond the inner surface 38. The clamping band 40 is then positioned within the first end portion 54 of the connector boot 50. The clamping band 40 is then expanded and locked, for example, using the wedge assembly 60 described above, to secure the first end portion 54 of the connector boot 50 against the inner hole surface 42. The wedge assembly 60 is preferably located at a region on the circumference of the hole 34 such that the wedge assembly 60 sits against a solid wall portion of the inner hole surface 42, i.e., such that the wedge assembly 60 does not overhang. The clamping band 40 is secured such that the portion 44 overhangs the inner surface 38 and the portion 46 overhangs the outer surface 36. The second end portion 56 of the connector boot 50 is then secured to the pipe 52, for example, using a conventional external clamping band.

Accordingly, the wider clamping band allows the hole size to be increased in a manhole riser or other type of cylindrical wall and provides sufficient clamping forces with an overhang on both sides of the hole.

Modifications and substitutions by one of ordinary skill in the art are considered to be within the scope of the present invention which is not to be limited except by the claims which follow.

What is claimed is:

1. A connection system comprising:
   a structure having a hole through a generally cylindrical wall of said structure, said hole extending from an outer generally cylindrical surface of said structure to an inner generally cylindrical surface of said structure;

a connector boot made of an elastomeric material having a first end portion and a second end portion, said first end portion extending into said hole in said structure; and a clamping band positioned against an inner boot surface of said first end of said connector boot and applying pressure outwardly to clamp said connector boot against an inner hole surface of said hole, said clamping band having a width such that at least one portion of said clamping band overhangs said outer generally cylindrical surface of said wall and wherein at least one portion of said band overhangs said inner generally cylindrical surface of said wall to provide an overhang.

2. The connection system of claim 1 wherein said structure includes a manhole riser.

3. The connection system of claim 2 further including a pipe connected to said second end portion of said connector boot.

4. The connection system of claim 1 wherein said connector boot includes first and second sealing regions on respective said first end portion and said second end portion.

5. The connection system of claim 1 wherein said clamping band has a C channel cross-section.

6. The connection system of claim 1 wherein about 43% of said clamping band makes contact with said inner hole surface indirectly through said connector boot.

7. The connection system of claim 1 wherein said generally cylindrical wall has an inner diameter of about 48 in. and an outer diameter of about 58 in., wherein said hole has a diameter of about 34 in., and wherein said width of said clamping band is about 4 in.

8. The connection system of claim 1 wherein said clamping band includes a locking mechanism for locking said clamping band into position against said first end portion of said connector boot.

9. The connection system of claim 1 wherein said clamping band includes an expanding/locking mechanism for expanding and locking said clamping band into position against said first end portion of said connector boot.

10. The connection system of claim 1 wherein said hole is deeper than a thickness of said generally cylindrical wall.

11. The connection system of claim 1 wherein said clamping band is made of stainless steel.

12. A method of connecting a pipe to a structure having a generally cylindrical wall with a hole therethrough, said method comprising the acts of:

positioning a first end portion of a connector boot within said hole in said generally cylindrical wall such that at least one portion of said connector boot extends beyond a generally cylindrical inner surface of said wall;

positioning a clamping band within said first end portion of said connector boot, wherein at least one portion of said clamping band overhangs said generally cylindrical inner surface and at least a portion of said clamping band overhangs a generally cylindrical outer surface of said wall;

expanding and locking said clamping band against said first end portion of said connector boot to secure said first end portion of said connector boot against an inner hole surface of said hole; and securing said second end portion of said connector boot to said pipe.

13. The method of claim 12 wherein said structure is a manhole riser.

14. The method of claim 12 wherein about 43% of said clamping band makes contact with said inner hole surface.

15. The method of claim 12 wherein said hole is deeper than a thickness of said generally cylindrical wall.

16. The method of claim 12 wherein said portions overhanging said inner surface and said outer surface of said wall are substantially equal.

17. A clamping band for connecting a pipe to a structure having a generally cylindrical wall with a hole extending therethrough from an outer generally cylindrical surface to an inner generally cylindrical surface, said clamping band comprising:

a band having first and second band ends, said band having a width such that a portion of said band extends beyond an inner hole surface to overhang said inner generally cylindrical surface and a portion of said band extends beyond said inner hole surface to overhang said outer generally cylindrical surface; and a band expanding/locking mechanism coupled to said band proximate said first and second band ends for locking said band into position.

18. The clamping band of claim 17 wherein said band has a c-shaped cross section and a thickness of about 0.075 in. and a width of about 4 in.

19. A connection system comprising:

a manhole riser having a hole through a generally cylindrical wall of said manhole riser, said hole extending from an outer generally cylindrical surface of said manhole riser to an inner generally cylindrical surface of said manhole riser;

a connector boot having a first end portion and a second end portion, said first end portion extending into said hole in said manhole riser; and a clamping band positioned against an inner boot surface of said first end of said connector boot and applying pressure outwardly to clamp said connector boot against an inner hole surface of said hole, said clamping band having a width such that at least one portion of said clamping band overhangs said outer generally cylindrical surface of said wall and wherein at least one portion of said band overhangs said inner generally cylindrical surface of said wall to provide an overhang.

20. The connection system of claim 19 further including a pipe connected to said second end portion of said connector boot.

21. A connection system comprising:

a structure having a hole through a generally cylindrical wall of said structure, said hole extending from an outer generally cylindrical surface of said structure to an inner generally cylindrical surface of said structure;

a connector boot having a first end portion and a second end portion, said first end portion extending into said hole in said structure; and a clamping band having an expanding/locking mechanism for expanding and locking said clamping band into position against said first end portion of said connector boot, said clamping band positioned against an inner boot surface of said first end of said connector boot and applying pressure outwardly to clamp said connector boot against an inner hole surface of said hole, said clamping band having a width such that at least one portion of said clamping band overhangs said outer generally cylindrical surface of said wall and wherein at least one portion of said band overhangs said inner generally cylindrical surface of said wall to provide an overhang.

* * * * *